(12) United States Patent
Boysen et al.

(10) Patent No.: US 10,210,489 B2
(45) Date of Patent: Feb. 19, 2019

(54) CREDENTIAL PROVISION AND PROOF SYSTEM

(75) Inventors: Andre Michel Boysen, Huntsville (CA); Troy Jacob Ronda, Toronto (CA); Pierre Antoine Roberge, Toronto (CA); Patrick Hans Engel, Richmond Hill (CA); Gregory Howard Wolfond, North York (CA)

(73) Assignee: SecureKey Technologies Inc., Toronto (CA)

( * ) Notice: Subject to any disclaimer, the term of this patent is extended or adjusted under 35 U.S.C. 154(b) by 77 days.

(21) Appl. No.: 13/640,275

(22) PCT Filed: Apr. 8, 2011

(86) PCT No.: PCT/CA2011/000371
§ 371 (c)(1),
(2), (4) Date: Oct. 9, 2012

(87) PCT Pub. No.: WO2011/123940
PCT Pub. Date: Oct. 13, 2011

(65) Prior Publication Data
US 2013/0036456 A1    Feb. 7, 2013

Related U.S. Application Data

(60) Provisional application No. 61/322,078, filed on Apr. 8, 2010.

(51) Int. Cl.
G06F 7/04    (2006.01)
G06F 15/16   (2006.01)
(Continued)

(52) U.S. Cl.
CPC ....... *G06Q 20/04* (2013.01); *G06Q 20/38215* (2013.01); *G06Q 20/425* (2013.01);
(Continued)

(58) Field of Classification Search
CPC ............. H04L 2209/56; H04L 2209/76; H04L 2463/102
(Continued)

(56) References Cited

U.S. PATENT DOCUMENTS 5,577,121 A * 11/1996 Davis .................. G06Q 20/341
                                                      380/283
6,199,113 B1 *  3/2001 Alegre .................... G06F 21/31
                                                      709/219
(Continued)

FOREIGN PATENT DOCUMENTS

EP    1862948 A1 * 12/2007
EP    2556624      7/2013
(Continued)

OTHER PUBLICATIONS

Federal Financial Institutions Examination Council, "Authentication in an Internet Banking Environment," www.ffiec.gov/pdf/authentication guidance.pdf, Oct. 12, 2005.*
(Continued)

*Primary Examiner* — Lynn D Feild
*Assistant Examiner* — Vadim Savenkov
(74) *Attorney, Agent, or Firm* — Bereskin & Parr LLP/S.E.N.C.R.L., s.r.l.

(57) ABSTRACT

A method of authenticating to a computer server involves a first authentication client transmitting an authentication token to the computer server via a first communications channel, and a second authentication client receiving a payload from the computer server via a second communications channel distinct from the first communications channel in accordance with an outcome of a determination of authenticity of the authentication token by the computer server.

28 Claims, 4 Drawing Sheets

(51) Int. Cl.
  *G06F 17/30* (2006.01)
  *H04L 29/06* (2006.01)
  *G06Q 20/04* (2012.01)
  *G06Q 20/38* (2012.01)
  *G06Q 20/42* (2012.01)
  *H04L 9/32* (2006.01)

(52) U.S. Cl.
  CPC .......... *H04L 9/3215* (2013.01); *H04L 9/3234* (2013.01); *H04L 9/3263* (2013.01); *H04L 63/0807* (2013.01); *H04L 63/0853* (2013.01); *H04L 63/18* (2013.01); *H04L 2209/56* (2013.01); *H04L 2463/102* (2013.01)

(58) Field of Classification Search
  USPC .................................. 726/2–10, 21; 713/168
  See application file for complete search history.

(56) References Cited

U.S. PATENT DOCUMENTS

| | | | |
|---|---|---|---|
| 7,849,323 B2* | 12/2010 | Field et al. | 713/184 |
| 7,861,077 B1 | 12/2010 | Gallagher, III | |
| 8,037,515 B2* | 10/2011 | Lundblade | 726/6 |
| 8,434,133 B2* | 4/2013 | Kulkarni | G06F 21/33 726/4 |
| 2004/0030659 A1 | 2/2004 | Gueh | |
| 2004/0059952 A1* | 3/2004 | Newport | G06Q 20/02 726/3 |
| 2004/0117661 A1* | 6/2004 | Karaoguz et al. | 713/201 |
| 2004/0117845 A1* | 6/2004 | Karaoguz et al. | 725/134 |
| 2005/0010758 A1 | 1/2005 | Landrock et al. | |
| 2005/0097330 A1 | 5/2005 | Lundblade | |
| 2008/0060064 A1* | 3/2008 | Wynn et al. | 726/5 |
| 2008/0086764 A1 | 4/2008 | Kulkarni et al. | |
| 2008/0212771 A1 | 9/2008 | Hauser | |
| 2009/0144810 A1 | 6/2009 | Gilboy | |
| 2009/0300745 A1 | 12/2009 | Dispensa | |
| 2010/0235637 A1* | 9/2010 | Lu et al. | 713/168 |
| 2012/0017268 A9* | 1/2012 | Dispensa | 726/7 |
| 2014/0157393 A1* | 6/2014 | Whitcomb | G06F 21/33 726/9 |

FOREIGN PATENT DOCUMENTS

| | | |
|---|---|---|
| WO | 2006065002 | 6/2006 |
| WO | 2009001197 | 12/2008 |
| WO | 2010063091 | 6/2010 |
| WO | 2011123940 | 10/2011 |

OTHER PUBLICATIONS

PCT International Preliminary Report on Patentability and Written Opinion of the International Searching Authority (PCT/CA2011/000371) dated Apr. 8, 2010.

PCT International Search Report (PCT/CA2011/000371) dated Aug. 4, 2011.

Australian Patent Examination Report No. 2, dated Jun. 17, 2016.

Documents relating to European App. No. 11764982.2, dated Mar. 21, 2017 (Extended European Search Report).

Document relating to U.S. Appl. No. 14/174,059 (Appendix to the Specification), Appendix A: Timo Aalto "1Pv6 Authentication Header and Encapsulated Security Payload" pp. 36-55.

Document relating to U.S. Appl. No. 14/174,059 (Appendix to the Specification), Appendix B: Markku Korhonen "1Pv6 Key Management" pp. 56-70.

Document relating to U.S. Appl. No. 14/174,059 (Office Action), dated Nov. 23, 2015.

* cited by examiner

CREDENTIAL PROVISION AND PROOF SYSTEM

RELATED APPLICATIONS

This patent application claims the benefit of the filing date of U.S. patent application Ser. No. 61/322,078, filed Apr. 8, 2010, entitled "Credential Provision and Proof System", the entire contents of which are incorporated herein by reference.

FIELD

This patent application relates to systems and methods for network client authentication. In particular, this patent application describes systems and methods for authenticating a client to a server using an authentication token.

BACKGROUND

An electronic credential may be required to complete a transaction (e.g. making a payment, providing proof of age) with a computer server. The computer server may employ cryptographic algorithms to authenticate the credential and thereby authorize the transaction. If the credential is contained within an electronic device (e.g. credit/payment card chip, e-passport, USB dongle), a credential reader may be required to access the electronic credential for authentication by the computer server.

The credential reader may be embedded within a communication device (e.g. point-of-sale terminal), in which case the computer server may complete the transaction with the communication device after successful authentication of the credential. This solution is not suitable, however, if the credential reader is not embedded within, or otherwise directly accessible to, a communication device that can complete the transaction.

SUMMARY

By way of overview, this patent application relates to a credential provision and proof system and associated method that authenticates one client of the system based on an authentication token released by another client of the system.

In a first aspect, this patent application describes a method of authenticating via a computer server. The method, according to this first aspect, involves the computer server receiving an authentication token from a first authentication client via a first communications channel, and determining the authenticity of the authentication token. In accordance with an outcome of the authenticity determining, the computer server transmits a payload to a second authentication client via a second communications channel that is distinct from the first communications channel.

The first aspect of this patent application also describes a computer server that includes an authentication client configured to determine the authenticity of an authentication token received at the computer server via a first communications channel, and to transmit a payload to a second authentication client via a second communications channel distinct from the first communications channel in accordance with an outcome of the authenticity determination.

In one implementation, the payload effects a completion of a transaction with a relying party server that is distinct from the computer server, the authentication token receiving comprises a first segment of the transaction, and the payload transmitting comprises a second segment of the transaction.

The first authentication client may be provided in a communication device, the authentication token may be provided in a hardware token that is distinct from the communication device, and the authentication token receiving may comprise the first authentication client requesting the authentication token from the hardware token, and the computer server receiving the requested authentication token from the first authentication client. Further, the authenticity determining may comprise the computer server verifying that the authentication token was generated by the hardware token.

The first authentication client and the authentication token may be provided in a common communication device, and the authentication token receiving may comprise the computer server receiving the authentication token released from the communication device. Alternately, the authentication token may be provided in a credential server, and the authentication token receiving may comprise the computer server receiving the authentication token from the credential server.

The payload transmitting may comprise the first authentication client specifying the second authentication client and the computer server directing the payload to the specified second authentication client. Alternately, the payload transmitting may comprise the computer server identifying the second authentication client after receipt of the authentication token, and the computer server directing the payload to the identified second authentication client.

The payload transmitting may comprise the computer server transmitting a session token to the first authentication client, receiving a payload request from the second authentication client, and transmitting the payload to the second authentication client in accordance with a correlation between the payload request and the session token.

The payload transmitting may further comprise the computer server establishing a secure communications channel with the second authentication client in accordance with the correlation, and transmitting the payload to the second authentication client over the secure communications channel, the second communications channel comprising the secure communications channel.

The payload may comprise an authentication payload for facilitating authentication of the second authentication client. Alternately, the payload may comprise a command for execution by the second authentication client.

In a second aspect, this patent application describes a method of authenticating to a computer server. The method, according to this second aspect, involves a first authentication client transmitting an authentication token to the computer server via a first communications channel, and a second authentication client receiving a payload from the computer server via a second communications channel distinct from the first communications channel in accordance with an outcome of a determination of authenticity of the authentication token by the computer server.

The second aspect of this patent application also describes a communication device that includes a first authentication client configured to transmit an authentication token to a computer server via a first communications channel; and a second authentication client configured to receive a payload from the computer server via a second communications channel distinct from the first communications channel in accordance with an outcome of a determination of authenticity of the authentication token by the computer server.

In one implementation, the second authentication client uses the payload to effect a completion of a transaction with a relying party server distinct from the computer server, the authentication token transmitting comprises a first segment of the transaction, and the payload receiving comprises a second segment of the transaction.

The first authentication client may be provided in a communication device, the authentication token may be provided in a hardware token that is distinct from the communication device, and the authentication token transmitting may comprise the first authentication client requesting the authentication token from the hardware token and transmitting the requested authentication token to the computer server.

The first authentication client and the authentication token may be provided in a common communication device, and the authentication token transmitting may comprise the communication device releasing the authentication token to computer server. Alternately, the authentication token may be provided in a credential server, and the authentication token transmitting may comprise the first authentication client authorizing the credential server to transmit the authentication token to the computer server.

The payload receiving may comprise the first authentication client identifying the second authentication client to the computer server and the computer server directing the payload to the identified second authentication client. The payload receiving may comprise the first authentication client receiving a session token from the computer server, and the second authentication client transmitting a payload request to the computer server and receiving the payload from the computer server in accordance with a correlation between the payload request and the session token. The payload receiving may further comprise the second authentication client establishing a secure communications channel with the computer server in accordance with the correlation, and receiving the payload over the secure communications channel, the second communications channel comprising the secure communications channel.

The payload may comprise an authentication payload, and the second authentication client may authenticate itself using the authentication payload. Alternately, the payload may comprise a command, and the second authentication client may execute the received command.

BRIEF DESCRIPTION OF THE DRAWINGS

The foregoing aspects will now be described, by way of example, with reference to the accompanying drawings, in which.

DETAILED DESCRIPTION

Credential Provision and Proof System

Figure 1:
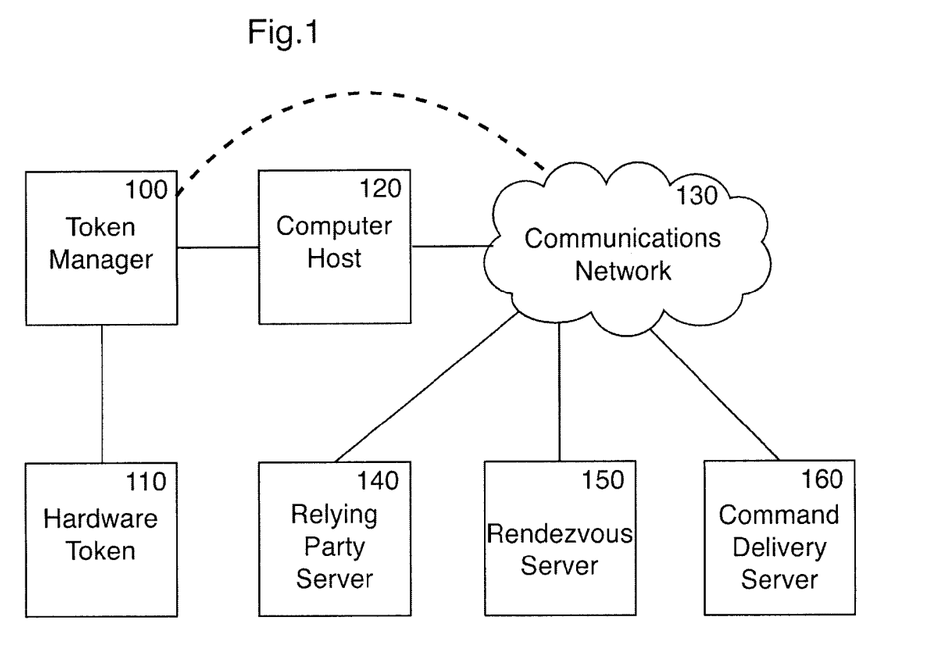
FIG. 1 is a block diagram illustrating the various components of the credential provision and proof system.

Turning to FIG. 1, there is shown an embodiment of a credential provision and proof system, comprising a Token Manager 100, a Hardware Token 110, a Computer Host 120, one or more Relying Party Servers 140, and optionally a Rendezvous Server 150. The credential provision and proof system may also include one or more Command Delivery Servers 160. Although the Computer Host 120, Relying Party Server 140, Rendezvous Server 150 and Command Delivery Server 160 are shown being interconnected by a single communications network 130, the communications network 130 may comprise one or more different networks.

The Token Manager 100 typically comprises a portable communication device (including, but not limited to, a USB computing/memory device, a data messaging device, a two-way pager, a wireless e-mail device, a wireless telephone, a wireless Internet appliance) that can interface with the Computer Host 120 via a wireless or wired connection. Although the Token Manager 100 is shown being distinct from the Computer Host 120, it should be understood that the Token Manager 100 and the Computer Host 120 need not be implemented as separate computing devices; rather, the functionality of the Token Manager 100 may be embedded within the Computer Host 120 such that the Token Manager 100 and the Computer Host 120 comprise a single computing device.

The Token Manager 100 typically includes a secure data processor that is implemented using smartcard technology and comprises a micro-processor and protected memory. The secure data processor provides a protected self-contained computing environment for running proprietary algorithms that are stored within the secure data processor. For example, the self-contained computing environment may implement an Authentication Agent procedure that transmits an authentication request to the Relying Party Server 140 (or the Command Delivery Server 160) for the purpose of authenticating the Token Manager 100.

The protected memory may store sensitive information required for implementation of the proprietary algorithms, including a unique identifier of the Token Manager 100, a private encryption key THPrivK and a public certificate THPubC. THPubC includes a public encryption key THPubK corresponding to THPrivK. THPrivK and THPubK comprise an asymmetric encryption key pair. Preferably, THPubC is signed by a trusted certificate authority.

THPrivK and THPubC may be installed on the Token Manager 100 before the Token Manager 100 is shipped to the intended recipient. Alternately, the recipient of the Token Manager 100 may initiate installation of THPrivK and THPubC on the Token Manager 100 by invoking a registration procedure with a trusted certificate authority. In either case, installation of THPrivK and THPubC causes the Token Manager 100 to be registered for use with the credential provision and proof system.

The Hardware Token 110 is a form of portable authenticator, and may be implemented as a contactless form factor, a contact form factor (e.g. magnetic stripe), or other NFC and/or ISO 14443 based form factors. Suitable implementations of the hardware token 110 include a smartcard, a payment card, a credit card, a loyalty card, a building access pass, a driver's licence, a health card, and a passport. Typically, the Hardware Token 110 has a hardware token number (e.g. payment card number, credit card number, loyalty card number, building access pass number, driver's licence number, health card number, or passport number) provided thereon.

The Hardware Token 110 typically includes a secure data processor that is implemented using smartcard technology and comprises a micro-processor and protected memory. The secure data processor provides a protected self-contained computing environment used for running cryptographic algorithms that are stored within the secure data processor. The protected memory stores sensitive information required for implementation of the cryptographic algorithms, including a unique identifier (CFFID) of the Hardware Token 110, an internal card counter number, and a diversified key, such as a triple-DES (Data Encryption Standard) key.

The Token Manager 100 may communicate with the Hardware Token 110 over a contactless protocol, such as ISO 14443. Alternately, the Token Manager 100 may communicate with the Hardware Token 110 without a wireless link. Although the Hardware Token 110 is shown being distinct from the Token Manager 100, it should be understood that the Hardware Token 110 and the Token Manager 100 need not be implemented as separate devices; rather, the functionality of the Hardware Token 110 may be embedded within the Token Manager 100 such that the Hardware Token 110 and the Token Manager 100 comprise a single device.

Figure 2:
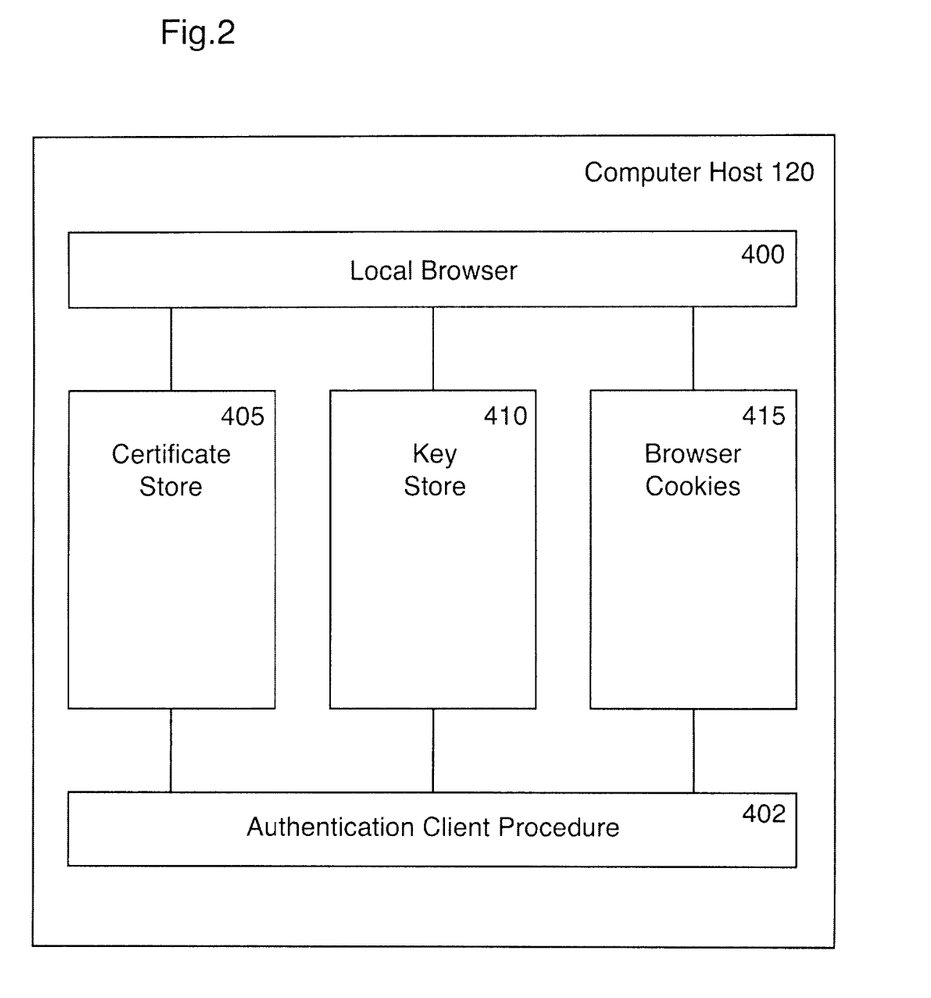
FIG. 2 is a schematic view of the Computer Host of the credential provision and proof system.

The Computer Host 120 comprises a networked computing device, and may be implemented in a variety of forms, including a personal computer, tablet computer, mobile phone and a set-top box. As shown in FIG. 2, the Computer Host 120 comprises a web browser 400 (or other communication application), an Authentication Client procedure 402, a Certificate Store 405, a Key Store 410, and a browser cookies store 415. The browser 400 interfaces with the Certificate Store 405, the Key Store 410 and browser cookies store 415, and is used to facilitate communication with the Relying Party Server 140, the Rendezvous Server 150 and the Command Delivery Server 160 over the communications network 130.

The Certificate Store 405 may contain zero or more public certificates. The Key Store 410 may contain zero or more private encryption keys. Preferably, the Computer Host 120 maintains in the Key Store 410 a private encryption key UPrivK that is uniquely associated with the user of the Computer Host 120, and maintains in the Certificate Store 405 a public certificate UPubC that includes a public encryption key UPubK corresponding to the private encryption key UPrivK. Preferably, the public encryption key UPubK and the private encryption key UPrivK comprise an asymmetric encryption key pair.

As will be discussed below, typically the Token Manager 100 and the Computer Host 120 are used to complete a transaction with the Relying Party Server 140. During a first phase of the transaction, the Token Manager 100 may receive an authentication token from a Hardware Token 110 that is interfaced with the Token Manager 100, and transmits the authentication token to the Relying Party Server 140 (or the Command Delivery Server 160) via a first communications channel for authenticity validation. The first communications channel may be implemented via the Computer Host 120, or may be implemented via a pathway that excludes the Computer Host 120.

During a second phase of the transaction, the Relying Party Server 140 (or the Command Delivery Server 160) determines the authenticity of the transmitted authentication token. If the authentication token is authenticated, the Relying Party Server 140 (or the Command Delivery Server 160) transmits a payload to the Computer Host 120 via a second communications channel that is different and distinct from the first communications channel. The Authentication Client procedure 402 may then use the payload to complete the transaction with the Relying Party Server 140.

Instead of the Token Manager 100 and the Hardware Token 110 being implemented as separate distinct devices, the functionality of the Token Manager 100 and the Hardware Token 110 may be implemented in a single common communication device. Accordingly, in one variation, the Token Manager 100 is pre-configured with an authentication token stored thereon, and the Token Manager 100 transmits the stored authentication token to the Relying Party Server 140 (or the Command Delivery Server 160) during the first phase of the transaction via a first communications channel that passes through the Computer Host 120 or excludes the Computer Host 120. The Computer Host 120 receives the payload from the Relying Party Server 140 (or the Command Delivery Server 160) during the second phase of the transaction (via a second communications channel that is different from the first communications channel), which the Authentication Client procedure 402 uses to complete the transaction with the Relying Party Server 140.

Alternately, instead of the Authentication Agent procedure and the Authentication Client procedure 402 being implemented in separate distinct devices, the Authentication Agent procedure and the Authentication Client procedure 402 may be implemented in a common communication device. Accordingly, in another variation, the Computer Host 120 is configured with the Authentication Agent procedure of the Token Manager 100 and the Authentication Client procedure 402. During the first phase of the transaction, the Authentication Agent procedure receives an authentication token from a Hardware Token 110 that is interfaced with the Computer Host 120, which the Authentication Agent procedure then transmits to the Relying Party Server 140 (or the Command Delivery Server 160) via a first communications channel. The Computer Host 120 receives the payload from the Relying Party Server 140 (or the Command Delivery Server 160) during the second phase of the transaction (via a second communications channel that is different from the first communications channel), which the Authentication Client procedure 402 uses to complete the transaction with the Relying Party Server 140.

The payload may comprise an authentication payload which the Authentication Client procedure 402 uses for authentication purposes. As an example, the authentication payload may comprise a session certificate which the Authentication Client procedure 402 uses to authenticate the Computer Host 120 to the Relying Party Server 140. Alternately, the payload may comprise a command for execution by the Authentication Client procedure 402. As an example, the command may comprise one or more form-fill commands which the Authentication Client procedure 402 uses to input data into the web browser 400. The command may direct the Computer Host 120 to display a message on a display device of the Computer Host 120, for example confirming details of the transaction. As another example, the command may include a session certificate and may instruct the Authentication Client procedure 402 to save the session certificate in the Certificate Store 405 for subsequent use by the web browser 400.

Although the credential provision and proof system has been described above with the Token Manager 100 implementing the Authentication Agent procedure and the Computer Host 120 implementing the Authentication Client procedure 402, in another variation the Token Manager 100 implements the Authentication Client procedure 402 and the Computer Host 120 implements the Authentication Agent procedure. In this latter variation, the Authentication Agent procedure receives an authentication token from a Hardware Token 110 that is interfaced with the Computer Host 120, which the Authentication Agent procedure then transmits to the Relying Party Server 140 (or the Command Delivery Server 160) via a first communications channel. The Token Manager 100 receives the payload from the Relying Party Server 140 (or the Command Delivery Server 160) during the second phase of the transaction (via a second communications channel that is different from the first communications channel), which the Authentication Client procedure 402 uses to complete the transaction with the Relying Party Server 140.

Again, instead of the Authentication Agent procedure and the Authentication Client procedure 402 being implemented in separate distinct devices, the Authentication Agent procedure and the Authentication Client procedure 402 may be implemented in a common communication device. Accordingly, in another variation, the Token Manager 100 is configured with the Authentication Agent procedure and the Authentication Client procedure 402. During the first phase of the transaction, the Authentication Agent procedure receives an authentication token from a Hardware Token 110 that is interfaced with the Token Manager 100, which the Authentication Agent procedure then transmits to the Relying Party Server 140 (or the Command Delivery Server 160) via a first communications channel. The Token Manager 100 receives the payload from the Relying Party Server 140 (or the Command Delivery Server 160) during the second phase of the transaction (via a second communications channel that is different from the first communications channel), which the Authentication Client procedure 402 uses to complete the transaction with the Relying Party Server 140.

As above, the payload may comprise an authentication payload which, for example, allows the Token Manager 100 to authenticate to the Relying Party Server 140. The payload may comprise a command for execution by the Authentication Client procedure 402 which, for example, comprises one or more form-fill commands or directs the Token Manager 100 to display a message (e.g. confirming details of the transaction) on a display device of the Token Manager 100.

The Relying Party Server 140, the Rendezvous Server 150 and the Command Delivery Server 160 may be implemented as computer web servers. The Relying Party Server 140 may be configured with a private encryption key RPPrivK and public certificate RPPubC. RPPubC includes a public encryption key RPPubK corresponding to RPPrivK. RPPrivK and RPPubK comprise an asymmetric encryption key pair. The Relying Party Server 140 is accessible by the Computer Host 120 via the communications network 130, and provides one or more services to the user of the Computer Host 120. Provided services include, but are not limited to, on-line e-commerce transactions, online account or database access, and file download/upload with the Relying Party Server. The user of the Computer Host 120 uses the web browser 400 to initiate and complete a transaction involving a service provided by the Relying Party Server 140.

The Rendezvous Server 150 facilitates indirect communication between the Authentication Agent procedure of the Token Manager 100 and the Authentication Client procedure 402 of the Computer Host 120 via the communications network 130. The Rendezvous Server 150 may also maintain credential information (e.g. User-ID/password/PIN) for each user registered with the credential provision and proof system. Optionally, the Rendezvous Server 150 may maintain in a data store, in association with the credential information, the unique identifier and/or the public certificate THPubC of each Token Manager 100 registered to the user.

The Command Delivery Server 160 may be configured with a private encryption key CPrivK and corresponding public certificate CPubC. CPubC includes a public encryption key CPubK corresponding to CPrivK. CPrivK and CPubK comprise an asymmetric encryption key pair. The Command Delivery Server 160 provides one or more services to the user of the Computer Host 120. Provided services include, but are not limited to, form-fill commands and transaction notification.

The Command Delivery Server 160 may also maintain user information (e.g. billing address, credit card number(s), bank account number(s), Social Insurance/Security Number) for each user registered with the credential provision and proof system. Optionally, the Command Delivery Server 160 may maintain in a data store, in association with the user information, the unique identifier and/or the public certificate THPubC of each Token Manager 100 registered to the user.

As will be discussed below, during a first phase of a transaction implemented between the Computer Host 120 and the Relying Party Server 140, the Relying Party Server 140 (or the Command Delivery Server 160) receives an authentication request from the Token Manager 100 via a first communications channel. The authentication request includes an authentication token that was either generated by the Token Manager 100 or was received by the Token Manager 100 from a Hardware Token 110 interfaced with the Token Manager 100. The Relying Party Server 140 (or the Command Delivery Server 160) determines the authenticity of the authentication token. If the authentication token is authenticated, during a second phase of the transaction the Relying Party Server 140 (or the Command Delivery Server 160) transmits a payload to the Computer Host 120 via a second communications channel that is different and distinct from the first communications channel. The Computer Host 120 may then use the payload to complete the transaction with the Relying Party Server 140. As mentioned, the first communications channel may be implemented via the Computer Host 120, or may be implemented via a pathway that excludes the Computer Host 120.

Alternately, the authentication token may comprise a cryptogram that is generated by the Hardware Token 110 from an artefact (e.g. random number) that is transmitted to the Hardware Token 110 from the Relying Party Server 140 (or the Command Delivery Server 160), and the Relying Party Server 140 (or the Command Delivery Server 160) validates the cryptogram by verifying that the cryptogram was generated by the Hardware Token 110 from the artefact.

Transactional Process: Example 1

Figure 3:
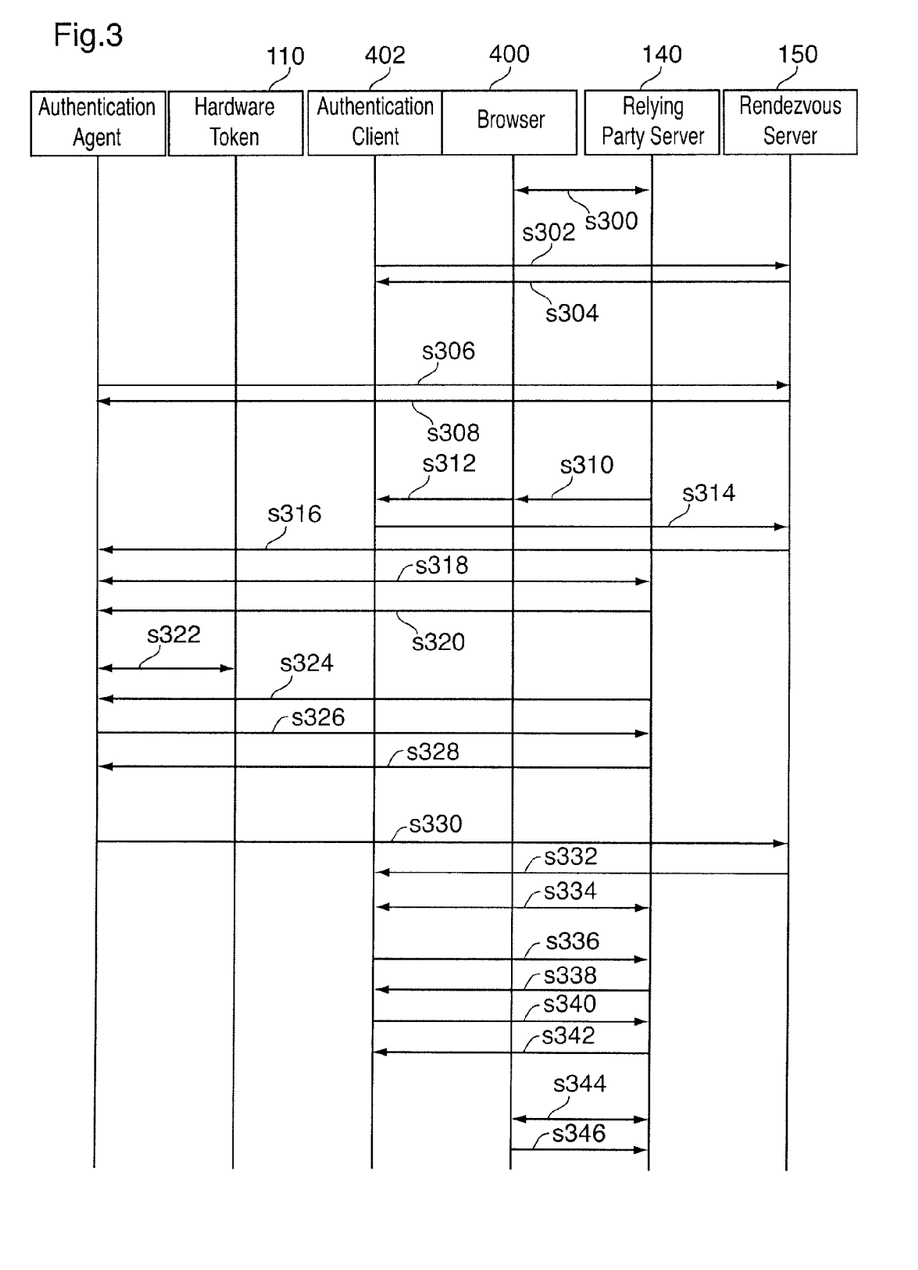
FIG. 3 is a message flow diagram that depicts the transmission of messages during a first embodiment of the credential provision and proof system.

A first sample transactional process implemented by the credential provision and proof system will be described below with reference to FIG. 3. In this transactional process, the user initiates a transaction with the Relying Party Server 140 using the web browser 400 of the Computer Host 120. After authenticating the Token Manager 100, the Relying Party Server 140 provides the Authentication Client procedure 402 with a payload that may comprise one or more commands for execution by the Computer Host 120. In this example, the payload comprises a session certificate and a command that instructs the Authentication Client procedure 402 to save the session certificate in the Certificate Store 405. The web browser 400 can then use the session certificate to authenticate the Computer Host 120 to the Relying Party Server 140.

Although, in this example process, a first stage of the transaction is implemented with the Token Manager 100 (acting as a first authentication client), and a second stage of the transaction is implemented with the Computer Host 120 (acting as a second authentication client), the responsibilities of the Token Manager 100 and the Computer Host 120 may be reversed such that the first stage of the transaction is implemented with the Computer Host 120 (acting as the first authentication client), and the second stage of the transaction is implemented with the Token Manager 100 (acting as the second authentication client). Further, although this example process is implemented using three distinct communication devices (Computer Host 120, Token Manager 100, Hardware Token 110), the process may be implemented by combining/separating the functions of these devices into fewer devices or more devices.

The first transactional process is initiated when the user starts a new session of the web browser 400, at step S300, and accesses the Relying Party Server 140. The user then initiates a transaction involving a service provided by the Relying Party Server 140, for example by selecting an appropriate link on the website hosted by the Relying Party Server 140. In response, the Relying Party Server 140 generates a session token, such as a random session number, and associates the session token with the selected service. The Relying Party website may then cause the Computer Host 120 to display a web page prompting the user to authenticate the Computer Host 120 to the Rendezvous Server 150.

To authenticate to the Rendezvous Server 150, the user initiates the Authentication Client procedure 402 on the Computer Host 120. In response, at step S302 the Authentication Client procedure 402 attempts to authenticate the Computer Host 120 to the Rendezvous Server 150, for example, by providing the Rendezvous Server 150 with the user's User-ID/password. Alternately, the Authentication Client procedure 402 may request an artefact (e.g. random number) from the Rendezvous Server 150. The Authentication Client procedure 402 may sign the artefact with the private encryption key UPrivK, and transmit the signed artefact back to the Rendezvous Server 150, together with the public certificate UPubC. The Rendezvous Server 150 may then authenticate the Computer Host 120 by verifying that the public certificate UPubC was signed by a public certificate authority, and using the public certificate UPubC to verify that the artefact was signed with the private encryption key UPrivK.

If the Computer Host 120 is successfully authenticated to the Rendezvous Server 150, the Rendezvous Server 150 transmits a suitable message to the Computer Host 120, at step S304. In addition to confirming successful authentication of the Computer Host 120 to the Rendezvous Server 150, the message may also prompt the user to authenticate to the Rendezvous Server 150 a Token Manager 100 that has been registered for use by the user. To authenticate to the Rendezvous Server 150, the user activates the Token Manager 100 and interfaces the Token Manager 100 with the Computer Host 120. The Token Manager 100 may prompt the user to authenticate to the Token Manager 100 (e.g. by entering a PIN).

If the user is able to successfully authenticate to the Token Manager 100, the user then initiates the Authentication Agent procedure on the Token Manager 100. In response, at step S306 the Authentication Agent procedure attempts to authenticate the Token Manager 100 to the Rendezvous Server 150, for example, by providing the Rendezvous Server 150 with the unique identifier of the Token Manager 100, and the user's password or PIN. Alternately, the Authentication Agent procedure may request an artefact (e.g. random number) from the Rendezvous Server 150. The Authentication Agent procedure may sign the artefact with the private encryption key THPrivK, and transmit the signed artefact back to the Rendezvous Server 150, together with the public certificate THPubC. The Rendezvous Server 150 may then authenticate the user by verifying that the public certificate THPubC was assigned to the Token Manager 100 by a public certificate authority, and using the public certificate THPubC to verify that the artefact was signed with the private encryption key THPrivK.

If the Token Manager 100 is successfully authenticated to the Rendezvous Server 150, the Rendezvous Server 150 transmits a suitable message to the Token Manager 100, at step S308. In addition to confirming successful authentication of the Token Manager 100 to the Rendezvous Server 150, the message may also notify the user that the Token Manager 100 is ready to accept commands from other members of the credential provision and proof system.

The user then initiates completion of the transaction with the Relying Party Server 140, for example by using the web browser 400 to select an appropriate link on the website hosted by the Relying Party Server 140. In response, the Relying Party Server 140 generates a Request Credential message which includes the session token that the Relying Party Server 140 associated with the selected service at step S300. The Relying Party Server 140 may sign the Request Credential message with the Relying Party Server's private key RPPrivK. The Relying Party Server 140 then transmits the Request Credential message and the Relying Party Server's Public Certificate RPPubC to the web browser 400, at step S310.

The Authentication Client procedure 402 may retrieve the signed Request Credential message and the Relying Party Server's Public Certificate RPPubC from the web browser 400 using, for example, IPC/RPC. The Authentication Client procedure 402 may then verify that the Relying Party Server's Public Certificate RPPubC was signed by a trusted certificate authority and, if verified, may validate the signed Request Credential message using the Relying Party Server's Public Certificate RPPubC.

At step S312, the Authentication Client procedure 402 initiates a first completion stage of the transaction with the Relying Party Server 140 by generating a Request Transaction message that includes the session token. Preferably, the Request Transaction message also specifies the network address (e.g. URL) of the Relying Party Server 140. The Authentication Client procedure 402 then transmits the Request Transaction message to the Rendezvous Server 150, at step S314.

At step S316, the Rendezvous Server 150 may sign the Request Transaction message with the Relying Party Server's private key RPPrivK. The Rendezvous Server 150 then redirects the (signed) Request Transaction message to the Token Manager 100. Preferably, the Token Manager 100 and the Computer Host 120 previously exchanged their respective public certificates, and the Authentication Client procedure 402 protects the session key pair by encrypting the Request Transaction message with the private encryption key UPrivK of the Computer Host 120 prior to transmission to the Token Manager 100.

To ensure that the Rendezvous Server 150 redirects the Request Transaction message to the "correct" Token Manager 100 (i.e. the Token Manager 100 that the user authenticated to the Rendezvous Server 150 at step S306), the user may have previously registered the Token Manager 100 with the Computer Host 120 (e.g. via the public certificate THPubC of the Token Manager 100). In this case, the Authentication Client procedure 402 may incorporate a unique identifier (e.g. from the public certificate THPubC) of the correct Token Manager 100 into the header of the Request Transaction message. Upon receipt of the Request Transaction Message, the Rendezvous Server 150 may determine the network address of the Token Manager 100 (e.g. from its list of Token Managers 100 that were authenticated with the Rendezvous Server 150 at step S306), and transmit the Request Transaction message to the identified Token Manager 100 at step S316.

Alternately, the user may have previously registered a unique identifier or public certificate THPubC of the Token Manager 100 with the Rendezvous Server 150. In this case, upon receipt of the Request Transaction Message, the Rendezvous Server 150 may use the UserID (associated with the Computer Host 120 at step S302) to query its data store for the unique identifier and/or the public certificate THPubC of the correct Token Manager 100. From its list of Token Managers 100 that were authenticated with the Rendezvous Server 150 at step S306, the Rendezvous Server 150 may then determine the network address of the correct Token Manager 100, and transmit the Request Transaction message to the identified Token Manager 100 at step S316.

In another variation, the Authentication Client procedure 402 may have already been provided with the network address of the Token Manager 100. In this latter variation, at step S314 the Authentication Client procedure 402 may incorporate into the message header the network transmit address of the Token Manager 100. The Authentication Client procedure 402 may transmit the Request Transaction message to the Token Manager 100 (possibly without the Rendezvous Server 150) using the specified network address.

In yet another variation, where the Token Manager 100 is in direct communication with the Computer Host 120 (wired, or wireless (e.g. WiFi, Bluetooth, NFC, WLAN)), the Authentication Client procedure 402 may transmit the Request Transaction message directly to the Token Manager 100. As will be apparent, in this variation, the Rendezvous Server 150 is not required to complete the transaction.

Upon receipt of the (signed) Request Transaction message, at step S318 the Authentication Agent procedure of the Token Manager 100 may verify that the Relying Party Server's Public Certificate RPPubC was signed by a trusted certificate authority and, if verified, may validate the signed Request Transaction message using the Relying Party Server's Public Certificate RPPubC. The Authentication Agent procedure then establishes a communications channel with the Relying Party Server 140 at the network address specified in the Request Transaction message. Preferably, the Authentication Agent procedure establishes a secure mutually-authenticated TLS channel using the Token Manager's public certificate THPubC and the Relying Party Server's Public Certificate RPPubC. Even if the Token Manager 100 is interfaced with the Computer Host 120, preferably the communications channel excludes the Computer Host 120 in the sense that no information that is transmitted over the communications channel is available in unencrypted form to any software running on the Computer Host 120 (e.g. web browser 400, Authentication Client procedure 402).

After the communications channel is established, the Relying Party Server 140 generates a Credential Request message that may include an artefact, such as a random number, to be used by a Hardware Token 110 in the generation of an authentication token. Optionally, the Relying Party Server 140 may sign the Credential Request message with the Relying Party Server's private key RPPrivK. The Relying Party Server 140 also generates a symmetric (AES) session key, optionally from the TLS channel.

The Relying Party Server 140 transmits the Credential Request message and the Relying Party Server's Public Certificate RPPubC to the Token Manager 100 via the communications channel, at step S320. The Authentication Agent procedure may verify that the Relying Party Server's Public Certificate RPPubC was signed by a trusted certificate authority. If verified, the Authentication Agent procedure may validate the signed Credential Request message using the Relying Party Server's Public Certificate RPPubC.

If the signed Credential Request message is successfully validated, the Authentication Agent procedure may prompt the user to interface a Hardware Token 110 with the Token Manager 100. Optionally, the Request Credential message includes a message for display on a display device of the Token Manager 100, notifying the user of the pending transaction and preferably providing transaction particulars, to thereby allow the user to terminate the transaction (for example, by not providing a Hardware Token 110) if it was commenced without the user's knowledge.

After the Hardware Token 110 is interfaced with the Token Manager 100, the Authentication Agent procedure transmits the Credential Request message to the Hardware Token 110, requesting an authentication token from the Hardware Token 110. Preferably, the Hardware Token 110 generates the authentication token from the artefact that was included with the Credential Request message. More preferably, the authentication token comprises a cryptogram which the Hardware Token 110 generates from the artefact, and the internal card counter number and diversified key of the Hardware Token 110. The Hardware Token 110 may employ a proof system (e.g. Microsoft UProve) in addition to, or in stead of, the foregoing cryptographic method.

At step S322, the Hardware Token 110 sends the authentication token to the Token Manager 100, together with the artefact and the internal card counter number of the Hardware Token 110 (if any). The Relying Party Server 140 associates the symmetric session key with the session token, and may transmit the session key and the session token to the Token Manager 100 via the communications channel, at step S324.

At step S326, the Authentication Agent procedure forwards the authentication token, artefact and internal card counter number (if any) to the Relying Party Server 140 for authentication of the authentication token. The Relying Party Server 140 may authenticate the authentication token by generating a reference value from the artefact, internal card counter number and its corresponding diversified key, and comparing the generated reference value against the received authentication token, thereby also verifying that the authentication token was generated by the Hardware Token 110.

Alternately, the authentication token might be generated from a credential server (not shown) instead of a Hardware Token 110. In this variation, the Token Manager 100 may authenticate with the credential server, and the Authentication Agent procedure may then transmit the Credential Request message to the credential server, requesting an authentication token from the credential server. Preferably, the credential server generates the authentication token from the artefact that was included with the Credential Request message, and forwards the authentication token and artefact to the Relying Party Server 140 for authentication of the authentication token, at step S326.

Regardless of the source of the authentication token, if the authentication token cannot be validated the Relying Party Server 140 may invalidate the session key and transmit a message to the Token Manager 100 advising that the authentication token could not be authenticated. Otherwise, at step S328, the Relying Party Server 140 transmits a message to the Token Manager 100, confirming successful authentication of the authentication token. The Authentication Agent procedure then generates a Connect message that includes the session key and the session token (received at step S324) and the network address of the Relying Party Server 140. The Authentication Agent procedure then transmits the Connect message to the Rendezvous Server 150, at step S330.

The Rendezvous Server 150 redirects the Request Transaction message to the Computer Host 120, at step S332. Preferably, the Token Manager 100 and the Computer Host 120 previously exchanged their respective public certificates, and the Authentication Agent procedure protects the session key by encrypting the Connect message with the private encryption key THPrivK of the Token Manager 100 prior to transmission to the Computer Host 120.

To ensure that the Rendezvous Server 150 redirects the Connect message to the correct Computer Host 120 (i.e. the Computer Host 120 that the user authenticated to the Rendezvous Server 150 at step S302), the header of the Request Transaction message (transmitted to the Token Manager 100 at step S316) may have included the network address of the Computer Host 120 (and the network address of the Token Manager 100). In this variation, the Authentication Agent procedure may extract the network address of the Computer Host 120 from the Request Transaction message, and incorporate the network address of the Computer Host 120 into the header of the Connect message. The Rendezvous Server 150 may transmit the Connect message to the Computer Host 120 at the specified network address, at step S334.

Alternately, the user may have previously registered the Computer Host 120 with the Token Manager 100 (e.g. via the public certificate UPubC of the Computer Host 120). In this case, the Authentication Agent procedure may incorporate a unique identifier (e.g. from the public certificate UPubC) of the correct Computer Host 120 into the header of the Connect message. Upon receipt of the Connect Message, the Rendezvous Server 150 may determine the network address of the Computer Host 120 (e.g. from its list of Computer Hosts 120 that were authenticated with the Rendezvous Server 150 at step S302), and transmit the Connect message to the identified Computer Host 120 at step S316.

In another variation, the user may have previously registered a unique identifier of the Token Manager 100 with the Rendezvous Server 150. In this case, upon receipt of the Connect Message, the Rendezvous Server 150 may use the UserID (associated with the Token Manager 100 at step S316) to query its data store for the correct Computer Host 120. From its list of Computer Hosts 120 that were authenticated with the Rendezvous Server 150 at step S302, the Rendezvous Server 150 may then determine the network address of the correct Computer Host 120, and transmit the Request Transaction message to the identified Computer Host 120 at step S334.

In another variation, where the Token Manager 100 is in direct communication with the Computer Host 120, the Authentication Agent procedure may transmit the Connect message directly to the Computer Host 120, at step S334. Again, in this variation the Rendezvous Server 150 is not required to complete the transaction.

Upon receipt of the Connect message, at step S336 the Authentication Client procedure 402 of the Computer Host 120 initiates a second completion stage of the transaction with the Relying Party Server 140 by requesting a payload from the Relying Party Server 140. To do so, the Authentication Client procedure 402 initiates a communications channel with the Relying Party Server 140 (at the network address (e.g. URL) specified in the Connect message) using the session token and the session key included in the Connect message. If, at step S326, the Relying Party Server 140 was unable to validate the authentication token that was associated with this session, the session key was invalidated and, therefore, the communications channel is refused at step S336.

If the authentication token was validated at step S326, the Relying Party Server 140 verifies that the Relying Party Server 140 had associated the session key with the session token at step S324. If the session key was not associated with the session token, the communications channel is refused at step S336. Otherwise, the Relying Party Server 140 establishes with the Computer Host 120 a communications channel that is distinct and different from the communications channel that was established between the Token Manager 100 and the Relying Party Server 140. Preferably, the Authentication Client procedure 402 establishes a secure mutually-authenticated TLS channel using the session key and the Relying Party Server's Public Certificate RPPubC.

After this second communications channel is established, at step S338 the Relying Party Server 140 transmits a Request Public Key message over the second communications channel, requesting a session public key from the Computer Host 120. In response, the Authentication Client procedure 402 may generate a session private encryption key SPrivK and a session public encryption key SPubK. The session private encryption key SPrivK and the session public encryption key SPubK comprise an asymmetric encryption key pair.

The Authentication Client procedure 402 transmits the session public key SPubK to the Relying Party Server 140 over the second communications channel, at step S340. Upon receipt of the session public key SPubK, the Relying Party Server 140 generates a payload that effects completion of the transaction with the Relying Party Server 140, and transmits the payload to the Computer Host 120 over the second communications channel, at step S342.

The payload may comprise a Session Certificate SCert which the Relying Party Server 140 generates from the session public key SPubK. The Session Certificate SCert may be populated with the session public key SPubK, and a ValidFrom time/date and a ValidTo time/date that makes the Session Certificate SCert valid for at least the duration of the session with the Relying Party Server 140. Optionally, the Session Certificate SCert may include the session token.

The Relying Party Server 140 then generates a Certificate Install command that includes the Session Certificate SCert. At step S342, the Relying Party Server 140 transmits the Certificate Install command to the Computer Host 120 over the second communications channel, requesting that the Computer Host 120 install the attached Session Certificate SCert.

Upon receipt of the Certificate Install command, the Authentication Client procedure 402 stores the Session Certificate SCert in the Certificate Store 405, and stores the associated session private Key SPrivK in the Key Store 410. Since the session keys SPubK, SPrivK were generated by the Token Manager 100, the Session Certificate SCert is uniquely associated with the Token Manager 100.

After the Session Certificate SCert is installed in the Computer Host 120, at step S344 the Computer Host 120 may authenticate itself to the Relying Party Server 140 using the Session Certificate SCert. To do so, the web browser 400 may use the Session Certificate SCert to establish a communications channel with the Relying Party Server 140. Preferably, the web browser 400 establishes a secure mutually-authenticated TLS channel using the Session Certificate SCert and the Relying Party Server's Public Certificate RPPubC. After this last communications channel is established, at step S346 the web browser 400 can complete the session with the Relying Party Server 140 that was initiated at step S300.

Transactional Process: Example 2

Figure 4:
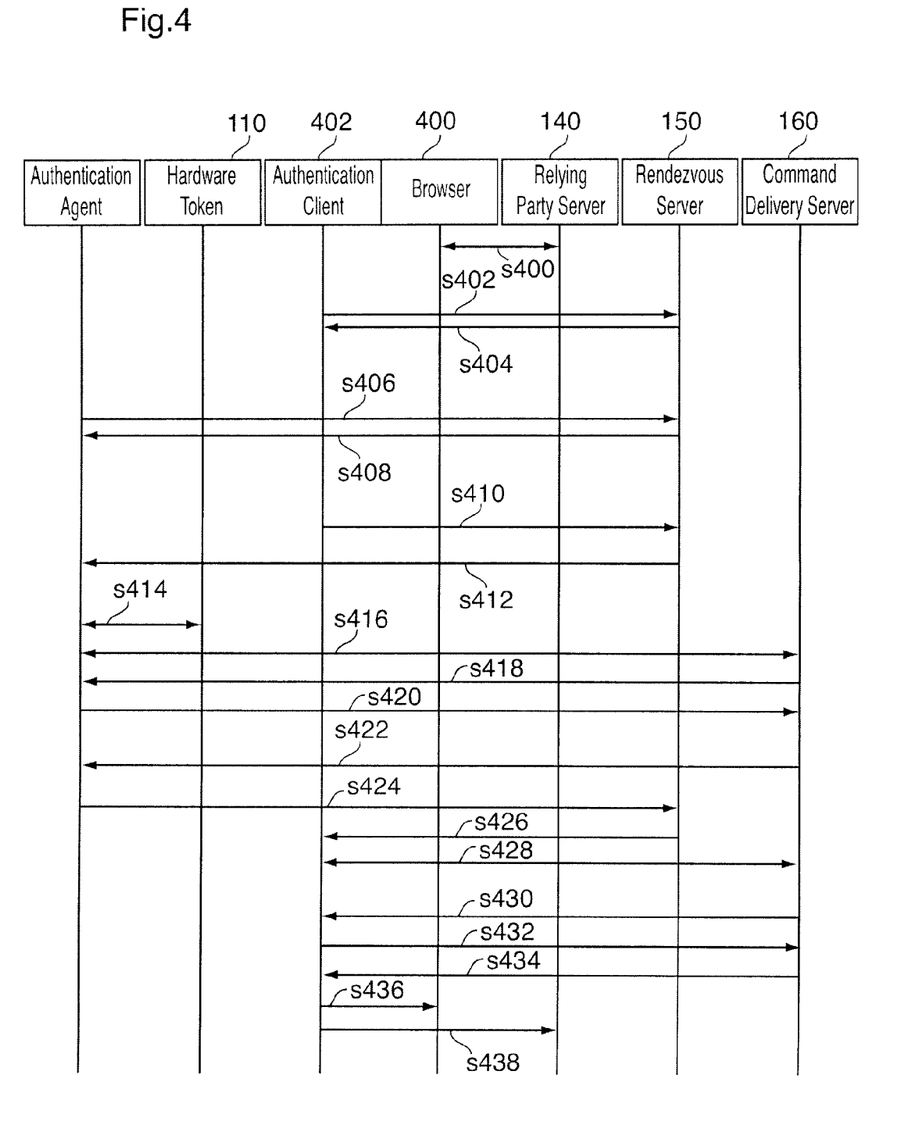
FIG. 4 is a message flow diagram that depicts the transmission of messages during a second embodiment of the credential provision and proof system.

A second sample transactional process implemented by the credential provision and proof system will be described below with reference to FIG. 4. This second transactional process is similar to the first transactional process, in that the user initiates a transaction with the Relying Party Server 140 using the web browser 400 of the Computer Host 120. However, in contrast to the first transactional process, the Token Manager 100 is not authenticated by the Relying Party Server 140, but is instead authenticated by the Command Delivery Server 160. After authenticating the Token Manager 100, the Command Delivery Server 160 provides the Authentication Client procedure 402 with a payload that may comprise one or more commands for execution by the Computer Host 120. In this example, the payload may comprise formatted data and/or form-fill commands which the Authentication Client procedure 402 uses to input data into the web browser 400 to thereby complete the transaction with the Relying Party Server 140.

Although, in this example process, a first stage of the transaction is implemented with the Token Manager 100 (acting as a first authentication client), and a second stage of the transaction is implemented with the Computer Host 120 (acting as a second authentication client), the responsibilities of the Token Manager 100 and the Computer Host 120 may be reversed such that the first stage of the transaction is implemented with the Computer Host 120 (acting as the first authentication client), and the second stage of the transaction is implemented with the Token Manager 100 (acting as the second authentication client). Further, although this example process is implemented using three distinct communication devices (Computer Host 120, Token Manager 100, Hardware Token 110), the process may be implemented by combining/separating the functions of these devices into fewer devices or more devices.

Steps S400 to S408 are substantially the same as steps S300 to S308 of the first transactional process and, therefore, will not be described in detail. As shown, the second transactional process is initiated when the user starts a new session of the web browser 400, at step S400, and selects a transaction involving a service provided by the Relying Party Server 140. In response, the Relying Party Server 140 generates a session token, such as a random session number, and associates the session token with the selected service.

The user then initiates authentication of the Computer Host 120 to the Rendezvous Server 150 by activating the Authentication Client procedure 402 on the Computer Host 120. In response, at step S402 the Authentication Client procedure 402 authenticates the Computer Host 120 to the Rendezvous Server 150. The user also interfaces the Token Manager 100 with the Computer Host 120, authenticates to the Token Manager 100 (e.g. by entering a PIN), and activates the Authentication Agent procedure on the Token Manager 100. In response, at step S406 the Authentication Agent procedure authenticates the Token Manager 100 to the Rendezvous Server 150.

After the Token Manager 100 is notified that it is ready to accept commands from other members of the credential provision and proof system, optionally the Relying Party Server 140 may transmit particulars of the transaction (e.g. item/service purchased, purchase amount) to the Computer Host 120, which the Authentication Client procedure 402 then retrieves from the browser cache. The Authentication Client procedure 402 then initiates a first completion stage of the transaction with the Relying Party Server 140 by generating a Request Transaction message that optionally includes the transaction particulars received from the Relying Party Server 140. Preferably, the Request Transaction message includes an artefact, such as a random number, to be used by a Hardware Token 110 in the generation of an authentication token.

The Authentication Client procedure 402 transmits the Request Transaction message to the Rendezvous Server 150, at step S410. At step S412, the Rendezvous Server 150 redirects the (signed) Request Transaction message to the Token Manager 100. Alternately, the Authentication Client procedure 402 may transmit the Request Transaction message directly to the Token Manager 100, as discussed above. Again, in this variation, the Rendezvous Server 150 is not required to complete the transaction.

Upon receipt of the (signed) Request Transaction message, the Authentication Agent procedure of the Token Manager 100 may verify that the Relying Party Server's Public Certificate RPPubC was signed by a trusted certificate authority and, if verified, may validate the signed Request Transaction message using the Relying Party Server's Public Certificate RPPubC. The Authentication Agent procedure may then prompt the user to interface a Hardware Token 110 with the Token Manager 100.

After the Hardware Token 110 is interfaced with the Token Manager 100, the Authentication Agent procedure requests an authentication token from the Hardware Token 110. Preferably, the Hardware Token 110 generates the authentication token from the artefact that was included with the Request Transaction message. More preferably, the authentication token comprises a cryptogram which the Hardware Token 110 generates from the artefact, and the internal card counter number and diversified key of the Hardware Token 110. At step S414, the Hardware Token 110 sends the authentication token to the Token Manager 100, together with the artefact and the internal card counter number of the Hardware Token 110 (if any).

At step S416, the Authentication Agent procedure of the Token Manager 100 establishes a communications channel with the Command Delivery Server 160. Preferably, the Authentication Agent procedure establishes a secure mutually-authenticated TLS channel using the Token Manager's public certificate THPubC and the Command Delivery Server's Public Certificate CPubC. Further, preferably the communications channel excludes the Computer Host 120.

After the communications channel is established, the Command Delivery Server 160 generates a symmetric (AES) session key, optionally from the TLS channel. The Command Delivery Server 160 may also generate a session token, such as a random session number, and associate the symmetric session key with the session token. Alternately, the Command Delivery Server 160 may receive the session token and particulars of the transaction from the Relying Party Server 140. The Command Delivery Server 160 may transmit the session key and the session token to the Token Manager 100 via the communications channel, at step S418.

At step S420, the Authentication Agent procedure forwards the authentication token, artefact, and internal card counter number (if any) to the Command Delivery Server 160 for authentication of the authentication token. Alternately, the authentication token might be generated from a credential server (not shown) instead of a Hardware Token 110. In this variation, the Token Manager 100 may authenticate with the credential server, and the Authentication Agent procedure may request an authentication token from the credential server. Preferably, the credential server generates the authentication token from the artefact that was included with the Request Transaction message, and forwards the authentication token and artefact to the Command Delivery Server 160 for authentication of the authentication token, at step S420.

Regardless of the source of the authentication token, if the authentication token cannot be validated the Command Delivery Server 160 may invalidate the session key and transmit a message to the Token Manager 100 advising that the authentication token could not be authenticated. Otherwise, at step S422, the Command Delivery Server 160 transmits a message to the Token Manager 100, confirming successful authentication of the authentication token. The Authentication Agent procedure then generates a Connect message that includes the session key and the session token (received at step S418) and the network address of the Command Delivery Server 160.

The Authentication Agent procedure transmits the Connect message to the Rendezvous Server 150, at step S424. The Rendezvous Server 150 redirects the Request Transaction message to the Computer Host 120, at step S426. Alternately, the Rendezvous Server 150 may transmit the Connect message directly to the Computer Host 120, as discussed above.

Upon receipt of the Connect message, at step S428 the Authentication Client procedure 402 of the Computer Host 120 initiates a second completion stage of the transaction with the Relying Party Server 140 by requesting a payload from the Command Delivery Server 160. To do so, the Authentication Client procedure 402 initiates a communications channel with the Command Delivery Server 160 using the session token, the session key and the network address (e.g. URL) that was specified in the Connect message.

If, at step S420, the Command Delivery Server 160 was unable to validate the authentication token that was associated with this session, the session key was invalidated and, therefore, the communications channel is refused at step S428.

If the authentication token was validated at step S420, the Command Delivery Server 160 verifies that the Command Delivery Server 160 had associated the session pair with the session token at step S418. If the session key was not associated with the session token, the communications channel is refused at step S428. Otherwise, the Command Delivery Server 160 establishes with the Computer Host 120 a communications channel that is distinct and different from the communications channel that was established between the Token Manager 100 and the Command Delivery Server 160. Preferably, the Authentication Client procedure 402 establishes a secure mutually-authenticated TLS channel using the session key and the Command Delivery Server's public certificate CPubC.

Alternately, the Command Delivery Server 160 may generate a session certificate SCert based on session keys generated by the Computer Host 120, and command the installation of the session certificate SCert in the Computer Host 120, as described above. The Authentication Client procedure 402 may establish the (secure mutually-authenticated) communication channel using the SCert and the Command Delivery Server's public certificate CPubC.

After this second communications channel is established, at step S430 the Command Delivery Server 160 transmits a message over the second communications channel, requesting that the Computer Host 120 provide particulars (e.g. computer name, IP address) of the Computer Host 120. In response, the Authentication Client procedure 402 transmits the computer particulars to the Command Delivery Server 160 over the second communications channel, at step S432. Upon receipt of the computer particulars, the Command Delivery Server 160 generates a payload that effects completion of the transaction with the Relying Party Server 140.

The payload may comprise formatted data and/or one or more web form-fill commands that the web browser 400 can use to provide the Relying Party Server 140 with information required to complete the session that was initiated at step S400. The Command Delivery Server 160 generates the formatted data and/or web form-fill commands from the computer particulars and, optionally, the user information maintained on the Command Delivery Server 160 (associated with the unique identifier and/or the public certificate THPubC of the user's Token Manager 100). Further, in the variation where the Relying Party Server 140 provides the Command Delivery Server 160 with particulars of the transaction, the Command Delivery Server 160 may generate the formatted data and/or web form-fill commands also using the transaction particulars.

At step S434, the Relying Party Server 140 transmits the payload to the Computer Host 120 over the second communications channel. Upon receipt, the Authentication Client procedure 402 forwards the payload to the web browser 400, at step S436. The web browser 400 completes the session with the Relying Party Server 140 by executing the form-fill command(s) at step s438. Alternately, Java-script executing on the Computer Host 120 may cause the web browser 400 to populate the Relying Party web page with the formatted data.

In one variation, the Command Delivery Server 160 transmits the formatted data and/or one or more of the form-fill command(s) to the Relying Party Server 140 over a communications channel that is distinct and different from the communications channel that was established between the Token Manager 100 and the Command Delivery Server 160.

The invention claimed is:

1. A method of authenticating via a computer server, comprising:
   the computer server receiving via a first communications channel an authentication token from a first authentication client, wherein the authentication token is generated by a hardware token;
   the computer server determining an authenticity of the authentication token, wherein the authenticity determining comprises the computer server verifying that the authentication token was generated by the hardware token; and
   in accordance with an outcome of the authenticity determining, the computer server:
   transmitting a session token to the first authentication client;

receiving a payload request comprising the session token from a second authentication client; and in accordance with a correlation between the payload request and the session token, transmitting a payload to the second authentication client via a second communications channel distinct from the first communications channel, the payload comprising at least one command for execution by the second authentication client, the at least one command comprising a form-fill command.

2. The method according to claim 1, wherein the payload effects a completion of a transaction with a relying party server distinct from the computer server, the authentication token receiving comprises a first segment of the transaction, and the payload transmitting comprises a second segment of the transaction.

3. The method according to claim 1, wherein the first authentication client is provided in a communication device, the hardware token generating the authentication token being distinct from the communication device, and the authentication token receiving comprises the first authentication client requesting the authentication token from the hardware token, and the computer server receiving the requested authentication token from the first authentication client.

4. The method according to claim 1, wherein the first authentication client and the authentication token are provided in a common communication device, and the authentication token receiving comprises the computer server receiving the authentication token released from the communication device.

5. The method according to claim 1, wherein the payload transmitting comprises the first authentication client specifying the second authentication client and the computer server directing the payload to the specified second authentication client.

6. The method according to claim 1, wherein the payload transmitting comprises the computer server identifying the second authentication client after receipt of the authentication token, and the computer server directing the payload to the identified second authentication client.

7. The method according to claim 1, wherein the payload transmitting further comprises the computer server establishing a secure communications channel with the second authentication client in accordance with the correlation, and transmitting the payload to the second authentication client over the secure communications channel, the second communications channel comprising the secure communications channel.

8. The method according to claim 1, wherein the payload comprises an authentication payload for facilitating authentication of the second authentication client.

9. The method according to claim 8, wherein the authentication payload comprises a session certificate and the command comprises instructions to store the session certificate at the second authentication client.

10. A computer server comprising:

an authentication client configured to determine an authenticity of an authentication token received at the computer server via a first communications channel from a first authentication client, wherein the authentication token is generated by a hardware token, and to transmit a payload to a second authentication client via a second communications channel distinct from the first communications channel in accordance with an outcome of the authenticity determination, wherein the authenticity determination comprises the authentication client verifying that the authentication token was generated by the hardware token, wherein the authentication client is configured to transmit a session token to the first authentication client, receive a payload request comprising the session token from the second authentication client, and transmit the payload to the second authentication client in accordance with a correlation between the payload request and the session token, the payload comprising at least one command for execution by the second authentication client, the at least one command comprising a form-fill command.

11. The computer server according to claim 10, wherein the first authentication client is provided in a communication device, the hardware token generating the authentication token being distinct from the communication device, and wherein the authentication client receives the authentication token from the first authentication client.

12. The computer server according to claim 10, wherein the first authentication client and the authentication token are provided in a common communication device, and the authentication client receives the authentication token from the communication device.

13. The computer server according to claim 10, wherein the first authentication client specifies the second authentication client, and the authentication client is configured to direct the payload to the specified second authentication client.

14. The computer server according to claim 10, wherein the authentication client is configured to identify the second authentication client after receipt of the authentication token, and to direct the payload to the identified second authentication client.

15. The computer server according to claim 10, wherein the authentication client is configured to establish a secure communications channel with the second authentication client in accordance with the correlation, and transmit the payload to the second authentication client over the secure communications channel, the second communications channel comprising the secure communications channel.

16. A method of authenticating to a computer server comprising:

a first authentication client transmitting an authentication token to the computer server via a first communications channel, wherein the authentication token is generated by a hardware token; and a second authentication client receiving a payload from the computer server via a second communications channel distinct from the first communications channel in accordance with an outcome of a determination of authenticity of the authentication token by the computer server, wherein the authenticity determination comprises the computer server verifying that the authentication token was generated by the hardware token, wherein the payload receiving comprises the first authentication client receiving a session token from the computer server, and the second authentication client transmitting a payload request comprising the session token to the computer server and receiving the payload from the computer server in accordance with a correlation between the payload request and the session token, the payload comprising at least one command for execution by the second authentication client, the at least one command comprising a form-fill command.

17. The method according to claim 16, wherein the first and second authentication clients are implemented in a common communication device.

18. The method according to claim 16, wherein the first and second authentication clients are implemented in separate communication devices.

19. The method according to claim 16, wherein the first authentication client is provided in a communication device, and the authentication token transmitting comprises the first authentication client requesting the authentication token from the hardware token and transmitting the requested authentication token to the computer server.

20. The method according to claim 16, wherein the first authentication client and the authentication token are provided in a common communication device, and the authentication token transmitting comprises the communication device releasing the authentication token to computer server.

21. The method according to claim 16, wherein the payload receiving comprises the first authentication client identifying the second authentication client to the computer server and the computer server directing the payload to the identified second authentication client.

22. The method according to claim 16, wherein the second authentication client uses the payload to effect a completion of a transaction with a relying party server distinct from the computer server, the authentication token transmitting comprises a first segment of the transaction, and the payload receiving comprises a second segment of the transaction.

23. The method according to claim 16, wherein the payload receiving further comprises the second authentication client establishing a secure communications channel with the computer server in accordance with the correlation, and receiving the payload over the secure communications channel, the second communications channel comprising the secure communications channel.

24. The method according to claim 23, wherein the payload comprises an authentication payload, and the second authentication client authenticates itself using the authentication payload.

25. The method according to claim 24, wherein the authentication payload comprises a session certificate.

26. The method according to claim 16, wherein the second authentication client executes the received command.

27. A communication device comprising:
a first authentication client configured to transmit an authentication token to a computer server via a first communications channel, wherein the authentication token is generated by a hardware token; and
a second authentication client configured to receive a payload from the computer server via a second communications channel distinct from the first communications channel in accordance with an outcome of a determination of authenticity of the authentication token by the computer server, wherein the authenticity determination comprises the computer server verifying that the authentication token was generated by the hardware token, wherein the payload receiving comprises the first authentication client receiving a session token from the computer server, and the second authentication client transmitting a payload request comprising the session token to the computer server and receiving the payload from the computer server in accordance with a correlation between the payload request and the session token, the payload comprising at least one command for execution by the second authentication client, the at least one command comprising a form-fill command.

28. A non-transitory computer-readable medium comprising computer processing instructions stored thereon, which, when executed by a computer server, cause the computer server to perform a method of authenticating via the computer server, the method comprising:
the computer server receiving via a first communications channel an authentication token from a first authentication client, wherein the authentication token is generated by a hardware token;
the computer server determining an authenticity of the authentication token, wherein the authenticity determining comprises the computer server verifying that the authentication token was generated by the hardware token; and
in accordance with an outcome of the authenticity determining, the computer server:
transmitting a session token to the first authentication client;
receiving a payload request comprising the session token from a second authentication client; and
in accordance with a correlation between the payload request and the session token, transmitting a payload to the second authentication client via a second communications channel distinct from the first communications channel, the payload comprising at least one command for execution by the second authentication client, the at least one command comprising a form-fill command.

* * * * *

UNITED STATES PATENT AND TRADEMARK OFFICE
CERTIFICATE OF CORRECTION

| | |
|---|---|
| PATENT NO. | : 10,210,489 B2 |
| APPLICATION NO. | : 13/640275 |
| DATED | : February 19, 2019 |
| INVENTOR(S) | : Andre Michel Boysen et al. |

It is certified that error appears in the above-identified patent and that said Letters Patent is hereby corrected as shown below:

In the Claims

Column 21, Line 33, the claim reference numeral '23' should read --16--.

Signed and Sealed this
Eighteenth Day of June, 2019

Andrei Iancu
*Director of the United States Patent and Trademark Office*